US011864492B2

(12) United States Patent
Moore (10) Patent No.: US 11,864,492 B2
(45) Date of Patent: Jan. 9, 2024

(54) IMPLEMENT DRIVE SYSTEM AND GROUNDS MAINTENANCE VEHICLE INCORPORATING SAME

(71) Applicant: EXMARK MANUFACTURING COMPANY, INCORPORATED, Beatrice, NE (US)

(72) Inventor: Nickolas T. Moore, Beatrice, NE (US)

(73) Assignee: EXMARK MANUFACTURING COMPANY INCORPORATED, Beatrice, NE (US)

( * ) Notice: Subject to any disclaimer, the term of this patent is extended or adjusted under 35 U.S.C. 154(b) by 1259 days.

(21) Appl. No.: 16/403,436

(22) Filed: May 3, 2019

(65) Prior Publication Data

US 2020/0346689 A1 Nov. 5, 2020

(51) Int. Cl.
*A01D 34/76* (2006.01)
*A01D 69/00* (2006.01)
*B62D 11/06* (2006.01)
*A01D 34/90* (2006.01)
*A01D 34/68* (2006.01)
*A01D 34/00* (2006.01)
*A01D 34/86* (2006.01)

(52) U.S. Cl.
CPC ............. *A01D 34/76* (2013.01); *A01D 69/00* (2013.01); *A01D 34/001* (2013.01); *A01D 34/866* (2013.01); *A01D 34/902* (2013.01); *A01D 2034/6837* (2013.01); *B62D 11/06* (2013.01)

(58) Field of Classification Search
CPC .... A01D 69/00; A01D 69/002; A01D 69/005; A01D 34/68; A01D 34/6806; A01D 34/76; A01D 34/80; A01D 2034/6837
See application file for complete search history.

(56) References Cited

U.S. PATENT DOCUMENTS

| 3,709,062 | A | * | 1/1973 | Draege | ................... F16H 37/00 |
| | | | | | 56/11.6 |
| 4,813,215 | A | * | 3/1989 | Chase | ..................... A01D 34/76 |
| | | | | | 56/11.6 |
| 5,251,429 | A | * | 10/1993 | Minato | ................ A01D 34/685 |
| | | | | | 56/DIG. 18 |

(Continued)

FOREIGN PATENT DOCUMENTS

WO WO 2017/214467 A1 12/2017

*Primary Examiner* — Thomas B Will
*Assistant Examiner* — Joan D Misa
(74) *Attorney, Agent, or Firm* — Mueting Raasch Group (57) ABSTRACT

Various embodiments of a grounds maintenance vehicle are described herein. The vehicle includes a frame and an implement connected to the frame. The implement includes a housing, a first spindle pulley, and a second spindle pulley. The vehicle further includes a power system having a prime mover and an implement drive system. The implement drive system includes a drive pulley connected to the prime mover, an idler pulley, and an endless belt engaging the drive pulley, the idler pulley, the first spindle pulley, and the second spindle pulley. A first longitudinal distance between an idler pulley axis and a drive pulley axis is greater than a second longitudinal distance between a first spindle pulley axis and the drive pulley axis and a third longitudinal distance between a second spindle pulley axis and the drive pulley axis.

20 Claims, 6 Drawing Sheets

(56) References Cited

U.S. PATENT DOCUMENTS

| | | | | |
|---|---|---|---|---|
| 5,361,566 A | * | 11/1994 | Hohnl | A01D 34/6806 |
| | | | | 56/DIG. 4 |
| 5,797,251 A | * | 8/1998 | Busboom | A01D 34/6812 |
| | | | | 56/11.8 |
| 6,651,413 B2 | | 11/2003 | Papke | |
| 7,596,934 B2 | * | 10/2009 | Waesche | A01D 69/00 |
| | | | | 56/11.9 |
| 7,665,284 B1 | * | 2/2010 | Funk | A01D 34/76 |
| | | | | 474/62 |
| 8,047,310 B2 | | 11/2011 | Kallevig | |
| 8,096,374 B1 | * | 1/2012 | Papke | A01D 34/82 |
| | | | | 180/6.48 |
| 8,567,166 B2 | * | 10/2013 | Minoura | A01D 69/06 |
| | | | | 56/11.6 |
| 8,763,355 B2 | * | 7/2014 | Sugio | A01D 34/81 |
| | | | | 56/255 |
| 9,161,490 B2 | * | 10/2015 | Melone | A01D 69/00 |
| 9,750,184 B2 | * | 9/2017 | Reichard | A01D 34/76 |
| 10,306,833 B2 | * | 6/2019 | Smith | A01D 67/04 |
| 10,729,073 B2 | | 8/2020 | Bryant et al. | |
| 2008/0034722 A1 | | 2/2008 | Wright et al. | |

\* cited by examiner

IMPLEMENT DRIVE SYSTEM AND GROUNDS MAINTENANCE VEHICLE INCORPORATING SAME

The present disclosure is directed to grounds maintenance vehicles such as power lawn mowers and, more particularly, to implement drive systems for use with such vehicles.

BACKGROUND

Riding grounds maintenance vehicles such as lawn mowers and the like are used by homeowners and professionals to care for lawns and other surfaces. These vehicles include a prime mover, e.g., internal combustion engine or electric motor, to power not only an implement (e.g., cutting deck) attached to the vehicle, but also a traction drive system that is adapted to propel the vehicle over a ground surface.

Landscape contractors sometimes prefer stand-on mowers or mowers with sulkies, the former including an operator platform attached to the mower, while the latter including a platform towed behind the mower. Such mowers allow turf to be mowed in an efficient, relatively quick manner as compared to some walk-behind and conventional riding mowers.

One benefit of stand-on mowers is that they are often shorter than conventional riding mowers and, consequently, may be more maneuverable under certain mowing conditions. Typically, stand-on mowers utilize an engine having a horizontally or vertically-oriented drive shaft to provide power, e.g., via endless belts, to both the implement and to the traction drive system. Each drive wheel may utilize its own hydrostatic pump, and each pump may be independently controlled to provide the mower with a very small turning radius and, in some instances, a zero-turning-radius (ZTR) such that the mower can spin about a midpoint between the two drive wheels.

SUMMARY

Embodiments described herein may provide a riding grounds maintenance vehicle having a configuration that addresses these and other issues.

In one aspect, the present disclosure provides a grounds maintenance vehicle that includes a frame having a front end, a rear end, and a longitudinal axis extending between the front end and the rear end, and an implement connected to the frame at or near the front end of the frame. The implement includes a housing, a first spindle pulley connected to the housing and adapted to rotate about a first spindle pulley axis, and a second spindle pulley connected to the housing and adapted to rotate about a second spindle pulley axis. The grounds maintenance vehicle further includes a power system having a prime mover and an implement drive system, where the prime mover is connected to the frame. The implement drive system includes a drive pulley connected to the prime mover and adapted to rotate about a drive pulley axis, an idler pulley connected to the frame or implement and adapted to rotate about an idler pulley axis, and an endless belt engaging the drive pulley, the idler pulley, the first spindle pulley, and the second spindle pulley. The idler pulley axis is disposed at a first longitudinal distance from the drive pulley axis, the first spindle pulley axis is disposed at a second longitudinal distance from the drive pulley axis, and the second spindle pulley axis is disposed at a third longitudinal distance from the drive pulley axis. Further, the first longitudinal distance is greater than each of the second longitudinal distance and the third longitudinal distance. A fleeting angle of the endless belt is defined by an elevation of the idler pulley relative to the drive pulley and a distance between the drive pulley axis and the idler pulley axis.

In another aspect, the present disclosure provides a stand-on riding grounds maintenance vehicle that includes a frame having a front end, a rear end, and a longitudinal axis extending between the front and rear ends, where the frame further includes a control tower at or near the rear end; a platform connected to the frame at or near the rear end, the platform adapted to support a standing operator; and an implement connected to the frame at or near the front end of the frame. The implement includes a housing, a first spindle pulley connected to the housing and adapted to rotate about a first spindle pulley axis, and a second spindle pulley connected to the housing and adapted to rotate about a second spindle pulley axis. The stand-on riding grounds maintenance vehicle also includes a power system having a prime mover and an implement drive system, where the prime mover is connected to the frame. The implement drive system includes a drive pulley connected to the prime mover and adapted to rotate about a drive pulley axis, an idler pulley connected to the frame or implement and adapted to rotate about an idler pulley axis, and an endless belt engaging the drive pulley, the idler pulley, the first spindle pulley, and the second spindle pulley. The idler pulley axis is disposed at a first longitudinal distance from the drive pulley axis, the first spindle pulley axis is disposed at a second longitudinal distance from the drive pulley axis, and the second spindle pulley axis is disposed at a third longitudinal distance from the drive pulley axis. The first longitudinal distance is greater than each of the second longitudinal distance and the third longitudinal distance. Further, a fleeting angle of the endless belt is defined by an elevation of the idler pulley relative to the drive pulley and a distance between the drive pulley axis and the idler pulley axis.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of exemplary embodiments, reference is made to the accompanying figures of the drawing that form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified by the term "about."

Embodiments of the present disclosure are directed to powered (e.g., self-propelled) grounds maintenance vehicles incorporating a power system that powers both an implement drive system attached to the vehicle and a traction drive system. For example, embodiments of the present disclosure may provide a ground maintenance vehicle that includes an implement and a power system having a prime mover and an implement drive system. The implement drive system can include a drive pulley connected to the prime mover, an idler pulley connected to the frame or the implement, and an endless belt that engages the drive pulley, the idler pulley, and first and second spindle pulleys of the implement of the vehicle. An idler pulley axis of the idler pulley is disposed at a first longitudinal distance from a drive pulley axis of the drive pulley, a first spindle pulley axis is disposed at a second longitudinal distance from the drive pulley axis, and a second spindle pulley axis is disposed at a third longitudinal distance from the drive pulley axis, where the first longitudinal distance is greater than each of the second longitudinal distance and the third longitudinal distance. A fleeting angle of the endless belt can be defined by both an elevation of the idler pulley relative to the drive pulley, and a distance between the drive pulley axis and the idler pulley axis. As used herein, the term "fleeting angle" means an angle formed by an intersection of a belt axis with a plane of rotation of the drive pulley as the belt either enters or exits the pulley. The fleeting angle may vary as the implement changes elevations relative to the drive pulley.

Figure 1:
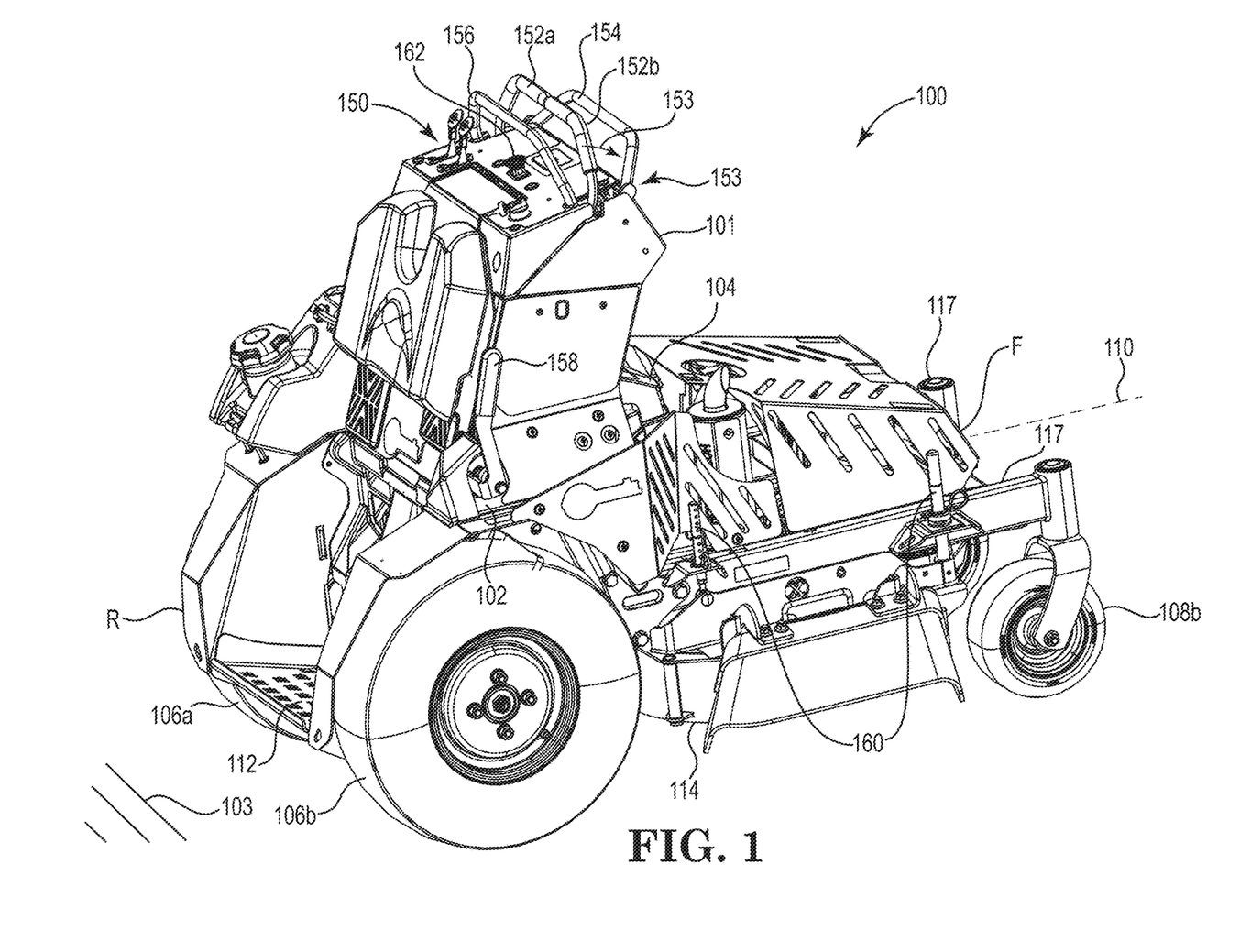
FIG. 1 is a right rear perspective view of a self-propelled grounds maintenance vehicle, e.g., stand-on lawn mower, incorporating an implement drive system in accordance with embodiments of the present disclosure.

With reference to the figures of the drawing, wherein like reference numerals designate like parts and assemblies throughout the several views, FIG. 1 illustrates a vehicular power system in accordance with one embodiment of the present disclosure as it may be incorporated on a self-propelled vehicle, e.g., a grounds maintenance vehicle 100. While, for the sake of brevity, embodiments of the disclosure are herein described with reference to a stand-on grounds maintenance vehicle, those of skill in the art will realize that the concepts described herein are equally applicable to other types of ground maintenance vehicles, e.g., sit-on riding mowers, walk-behind and ride-behind mowers (e.g., such as those utilizing sulkies), as well as to almost any other walk-behind, ride-behind, or ride-on self-propelled, grounds maintenance vehicle. Such vehicles may include, for example, skid-steer loaders, aerators, material spreaders and sprayers, snow throwers, tillers, etc.

It is noted that the term "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the ground maintenance vehicle 100 while the vehicle is in an operating configuration, e.g., while the vehicle 100 is positioned such that ground engaging members (e.g., wheels 106 and 108) rest upon a generally horizontal ground surface 103 as shown in FIG. 1. These terms are used only to simplify the description, however, and not to limit the interpretation of any embodiment described.

Still further, the suffixes "a" and "b" may be used throughout this description to denote various left- and right- side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

Figure 2:
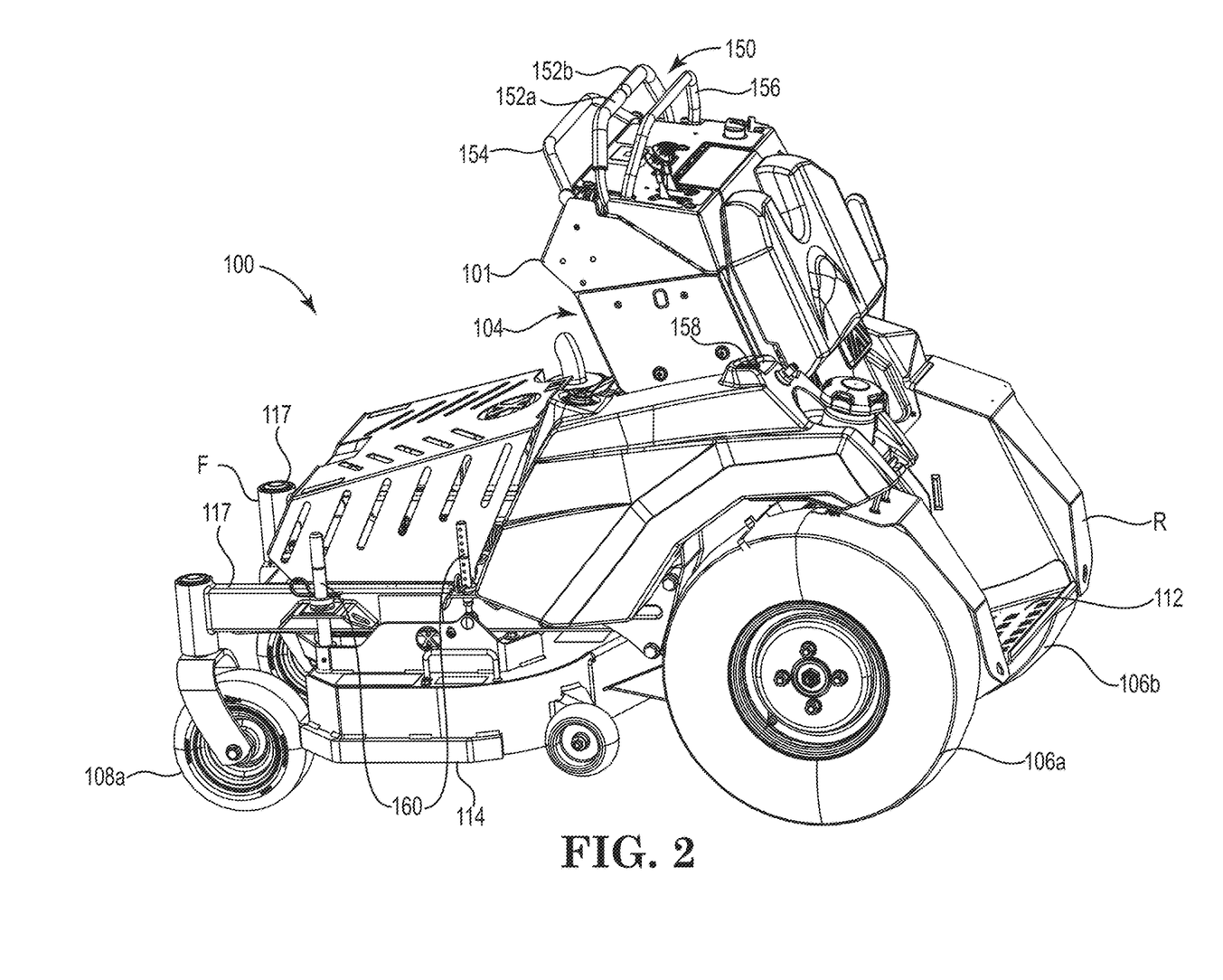
FIG. 2 is a left rear perspective view of the stand-on riding mower of FIG. 1.

While not necessarily central to an understanding of exemplary embodiments of the present disclosure (e.g., other vehicle configurations are certainly contemplated), the general construction of the exemplary vehicle 100 is briefly described herein. FIGS. 1 and 2 illustrate the vehicle 100 having a chassis or frame 102 having a front end F and a rear end R (and a longitudinal axis 110 extending between the front and rear ends), the frame 102 supporting a power source or prime mover, e.g., internal combustion engine 104. A pair of transversely opposing, ground engaging members, e.g., first and second (left and right) rear drive wheels 106a and 106b, may be coupled to opposite (left and right) rear sides of the chassis to support the mower upon, and propel the mower 100 relative to, a ground surface 103. Each drive wheel 106 may be powered by its own hydraulic motor 105 (left and right motors 105a, 105b shown in FIG. 3) that receives power from, at least in one embodiment, its own hydrostatic pump 107 (see left and right pumps 107a, 107b in FIG. 3). The pumps 107 may be supported by the frame 102 and powered by the engine 104 as further described herein via a traction drive system 200. While not illustrated, other drive systems, e.g., gear or pulley driven systems, may also be utilized without departing from the scope of the disclosure.

Operator controls, as further described herein, permit independent control of the speed and direction of each drive wheel 106, allowing operator control of vehicle 100 speed and direction from a walking or riding (e.g., standing) position generally behind the vehicle. A pair of front ground engaging members (e.g., left and right caster wheels 108a (FIG. 2), 108b), which may be connected to forwardly extending frame rails 117, may support the front of the vehicle 100 in rolling engagement with the ground surface 103.

Although the illustrated vehicle 100 has the drive wheels 106 in the rear and caster wheels 108 in front, this configuration is not limiting. For example, other embodiments may reverse the location of the wheels, e.g., drive wheels in front and driven or undriven wheels in back. Moreover, other configurations may use different wheel configurations altogether, e.g., a tri-wheel configuration or a vehicle having conventionally-steered wheels. These and other embodiments are certainly possible without departing from the scope of the present disclosure. Moreover, while illustrated herein as wheels, other ground engaging members (e.g., tracks, skids, etc.) are also contemplated.

An implement 114 (e.g., cutting deck) 114, may be connected to a lower side of the frame 102 (generally longitudinally between the drive wheels 106 and the caster wheels 108). The implement 114 may include two or more cutting blades 358 (FIG. 5) as known in the art. The cutting blades 358 may be operatively powered, via spindles (e.g., spindles 310 and 336 of FIG. 5) connected to the deck, by the engine 104 via an implement drive system 300 (see FIG. 3) as further described herein. During operation, power is selectively delivered to the implement 114, whereby the blades rotate at a speed sufficient to sever grass and other vegetation as the implement passes over the ground surface 103. As indicated herein, other grounds maintenance vehicles (e.g., snow throwers) may locate the implement above the frame, or at other locations along the lower side of the frame (e.g., a forwardly-mounted or "out-front" deck configuration). Moreover, while described as a cutting deck, the implement may be any tool (e.g., snow thrower, aerator, etc.) that attaches to the frame 102.

The exemplary vehicle 100 may further include a standing platform 112 attached to the frame 102 at or near the rear end R. The platform 112, which may support a standing operator, may be moved between a deployed position as shown in FIG. 1, and a stowed position (not shown, but similar to the position of the platform 120 shown in FIG. 2 of U.S. Pat. No. 8,047,310). In the deployed position, an operator may stand upon the platform 112 during vehicle operation. Alternatively, the platform 112 may be moved to the stowed position to accommodate the operator in a walk-behind configuration. In the deployed position, at least a portion of the platform 112 may be located between the rear drive wheels 106.

As illustrated in FIGS. 1-2, the vehicle 100 may further include an operator control system 150. In the illustrated embodiment, the control system 150 may include operator controls that are mounted to upwardly extending portions of the frame referred to herein as control tower 101. The control tower 101 may be located at or near the rear end R of the mower 100. Situated near the top of the control tower 101 is a control area that positions mower controls within comfortable reach of an operator who may be standing either behind the mower or upon the platform 112.

The control system 150 may include a first control lever 152a and a second control lever 152b pivotally attached to the mower 100, e.g., to the control tower 101. The control levers 152 may be configured to pivot about a generally transverse axis (i.e., an axis transverse to the longitudinal axis 110 of the mower 100) between a first or forward stop 154, and a second or rearward stop 156. One or both of the control levers 152 (e.g., 152b as shown in FIG. 1) may also be biased for pivotal outward movement (e.g., in a direction 153 about an axis generally parallel to the longitudinal axis 110). Such a configuration may permit, upon pivotal inward movement of the control lever 152b by the operator to the position shown in FIG. 1, activation of an operator presence switch (not shown). As is recognized in the art, actuation of the operator presence switch may be required before the operator can activate various vehicle subsystems.

As FIGS. 1-2 illustrate, the control system 150 may also include other features. For instance, a parking brake handle 158 may be provided to selectively activate a brake when the vehicle is parked. A deck height adjustment mechanism 160 may also be provided to adjust a height, e.g., the cutting height, of the implement 114. Other controls may include a throttle lever to control the speed of the engine 104, and an implement clutch control 162 to initiate and terminate power delivery to the cutting blades 358 of the implement 114.

Figure 3:
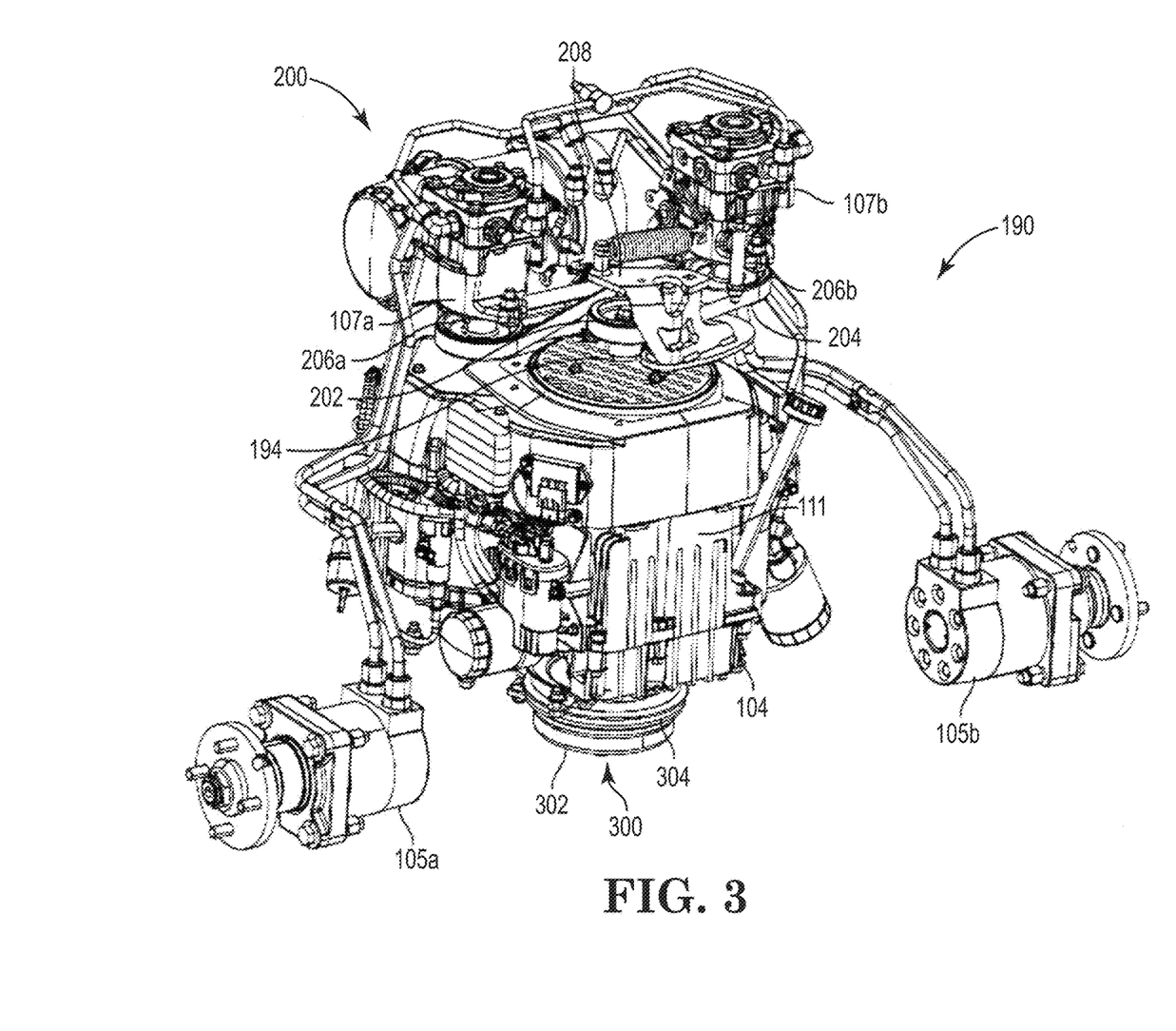
FIG. 3 illustrates a power source and traction drive system in accordance with embodiments of the present disclosure, the power source and traction drive system shown isolated from the mower of FIG. 1.

With this brief introduction, a power system 190 in accordance with embodiments of the present disclosure will now be described, initially with reference to FIG. 3. In general, the vehicle 100 can include any suitable power system 190, e.g., one or more embodiments of power systems described in U.S. patent application Ser. No. 15/803,979, entitled GROUNDS MAINTENANCE VEHICLE WITH POWER SYSTEM INCORPORATING DUAL DRIVE SHAFTS. The exemplary power system 190 may include the power source (e.g., the engine 104), as well as the traction drive system 200 and implement drive system 300.

Figure 4:
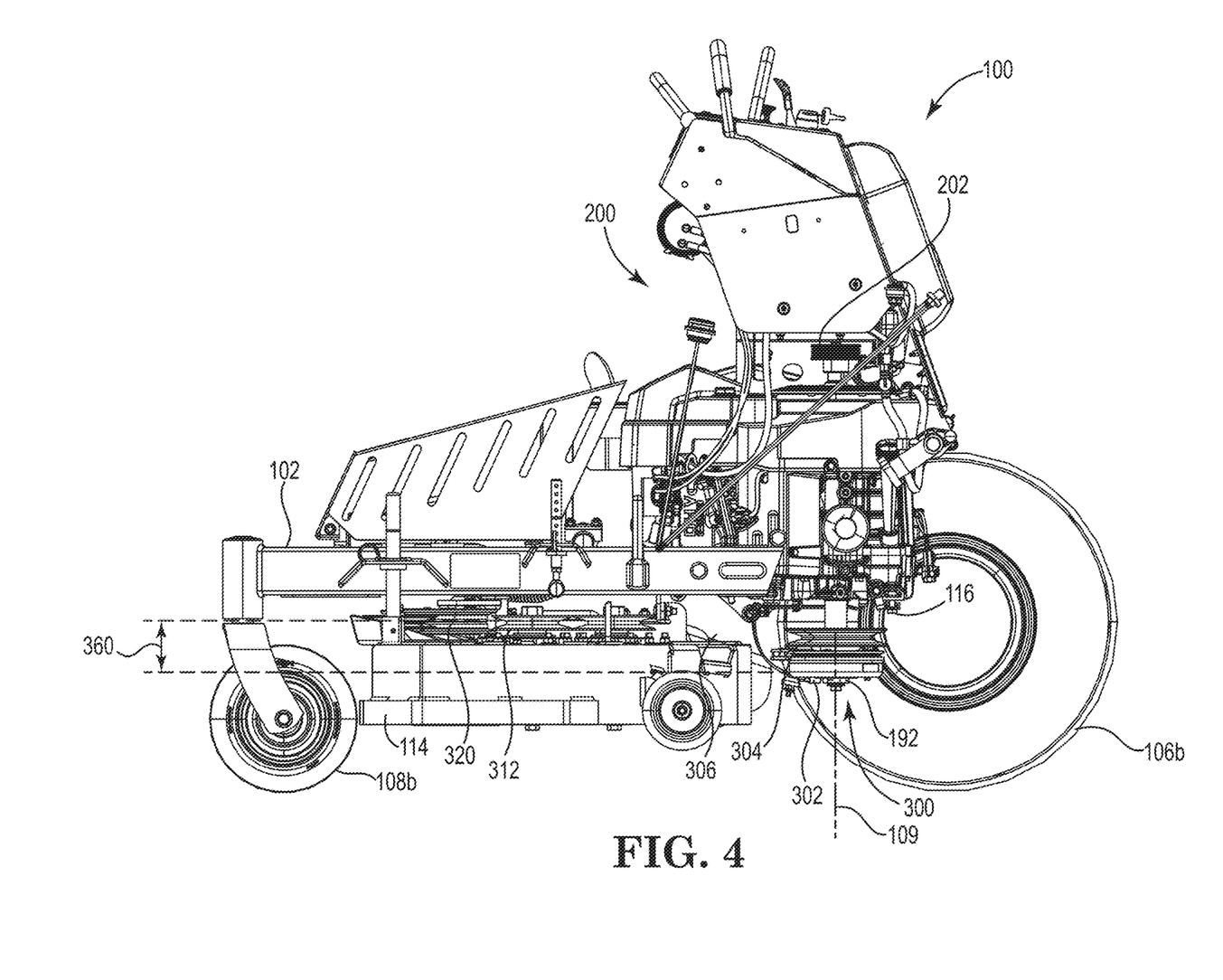
FIG. 4 is a partial side elevation view of the mower of FIG. 1 illustrating an exemplary power source and implement drive system relative to a frame of the mower.
Figure 5:
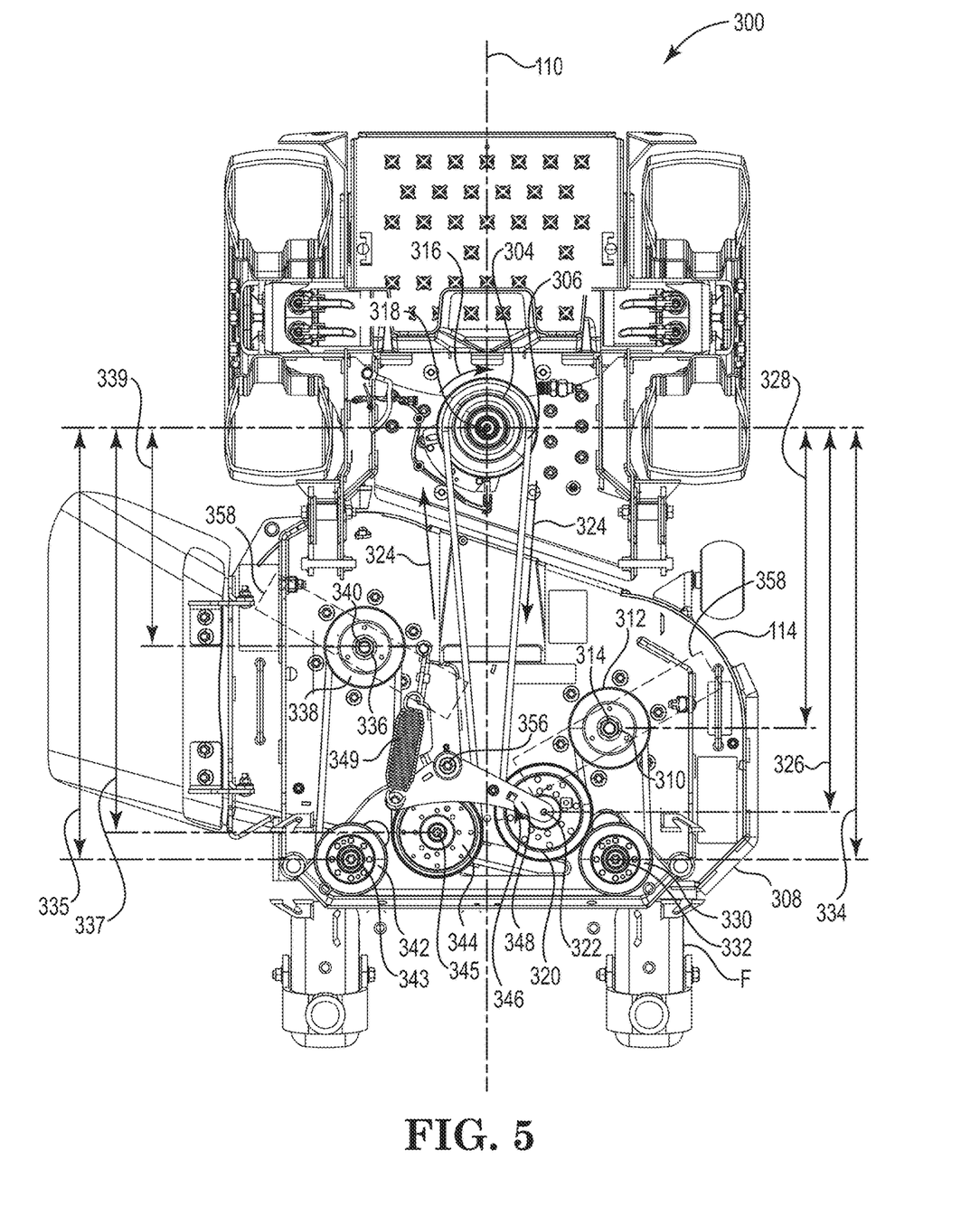
FIG. 5 is a schematic cross-sectional view of the implement drive system of the mower of FIG. 1.

The engine 104 may include a vertically-oriented crankshaft that extends downwardly from a lower side or surface of the engine housing 111, to provide a first or lower drive shaft 192 (see FIG. 4). The lower drive shaft 192 is adapted to rotate about a rotational axis 109. In the illustrated embodiments, the implement drive system 300 (which may be at or near a first or lower side of the engine) includes an electro-magnetic clutch 302 attached to the lower drive shaft 192. The clutch 302 is connected to a drive pulley 304 about which an endless belt 306 of the drive system 300 is routed as shown in FIGS. 4-5. The belt 306 is also engaged with one or more spindle pulleys 312, 338 (FIG. 5) on the implement 114 as is further described herein. In one or more embodiments, the clutch 302 is adapted to selectively enable and disable power to the implement 114. When the clutch 302 is actuated (e.g., via the control 162 (FIG. 1)), the pulley 304 becomes engaged with the lower drive shaft 192 and rotates therewith. As a result, the lower drive shaft 192, via the belt 306, provides power to the implement 114, causing the blades 358 to rotate. Similarly, de-energizing the clutch 302 disables power delivery to the implement 114.

The implement 114 can be connected to the frame 102 of the vehicle 100 in any suitable location. In one or more embodiments, the implement 114 is connected to the frame 102 at or near the front end F of the frame. The implement 114 can include any suitable implement as is further described herein. In one or more embodiments, the implement 114 can include a housing 308, the first spindle pulley 312, and the second spindle pulley 338 connected to the housing by first and second spindles 310, 336 respectively (FIG. 5). The spindles 310, 336 can include and/or connect to one or more cutting blades 358 that are adapted to cut grass or other vegetation. The first spindle pulley 312 is adapted to rotate about a first spindle pulley axis 314, and the second spindle pulley 338 is adapted to rotate about a second spindle pulley axis 340. In one or more embodiments, the first spindle pulley axis 314 is substantially parallel to a rotational axis 109 of the drive shaft 192. As used herein, the term "substantially parallel" means that an angle formed between a pulley axis and the rotational axis 109 of the drive shaft 192 is less than 10 degrees to accommodate rake angle variation of the cutting deck 114. In one or more embodiments, the second spindle pulley axis 340 is substantially parallel to the rotational axis 109 of the drive shaft 192. Although depicted as including two spindles, the implement 114 can include any suitable number of spindles, e.g., 1, 2, 3, 4, 5, or more spindles.

As mentioned herein, the power system 190 of vehicle 100 can also include the implement drive system 300. The implement drive system 300 can include any suitable system for transferring power from the prime mover 104 to the implement 114. In the embodiment illustrated in FIGS. 1-5, the implement drive system 300 includes the drive pulley 304 that is connected to the prime mover 104 using any suitable technique or techniques. The drive pulley 304 is adapted to rotate about a drive pulley axis 318, which is colinear with the rotational axis 109 of the drive shaft 192. In the embodiment illustrated in FIG. 5, the drive pulley 304 is adapted to rotate about the drive pulley axis 318 in a clockwise direction 316 as viewed in FIG. 5. In other embodiments, the drive pulley 304 can be adapted to rotate about the drive pulley axis 318 in a counterclockwise direction. Further, in one or more embodiments, the drive pulley 304 can be adapted to rotate about the drive pulley axis 318 in either the clockwise direction 316 or counterclockwise direction.

The drive pulley 304 can be disposed in any suitable location relative to the implement 114 and the vehicle 100. In one or more embodiments, the drive pulley axis 318 of the drive pulley 304 intersects the longitudinal axis 110 of the frame 102 of the vehicle 100.

The implement drive system 300 also includes an idler pulley 320 connected to the housing 308 of the implement 114. In one or more embodiments, the idler pulley 320 can be connected to the frame 102 or the implement 114 (e.g., the housing 308 of the implement). The idler pulley 320 is adapted to rotate about an idler pulley axis 322 in at least one of a clockwise or counterclockwise direction. In one or more embodiments, the idler pulley axis 322 is substantially parallel to the rotational axis 109 of the drive shaft 192. The idler pulley 320 can be connected to the frame 102 or implement 114 using any suitable technique or techniques such that it is adapted to rotate about the idler pulley axis 322. In one or more embodiments, the idler pulley 320 can be connected to the housing 308 of the implement 114 by a tensioner 346 that includes an arm 348 that is adapted to pivot about a pivot point 356. The tensioner 346 can be connected to a resilient spring 349 that causes the arm 348 to rotate about the pivot point 356 to maintain tension in the endless belt 306. As a result, the idler pulley axis 322 can be adapted to rotationally move about the pivot point 356 of the tensioner 346 while remaining substantially parallel to the rotational axis 109 of the drive shaft 192.

The implement drive system 300 also includes the endless belt 306 that engages the drive pulley 304, the idler pulley 320, the first spindle pulley 312, and the second spindle pulley 338. In one or more embodiments, the endless belt 306 extends along a belt path 324 from the drive pulley 304 directly to the idler pulley 320 as the drive pulley 304 rotates in a clockwise direction 316. As used herein, the term "directly" means that the endless belt 306 does not contact another pulley of the vehicle 100 or implement 114 between the drive pulley 304 and the idler pulley 320 as the endless belt extends along the belt path 324 between the drive pulley and the idler pulley, with the exception that the endless belt may contact a guide or other element between the drive pulley and the idler pulley that does not change or alter a fleeting angle 350 of the endless belt (FIG. 6).

The idler pulley 320, the first spindle pulley 312, and the second spindle pulley 338 can be disposed in any suitable location or locations relative to the drive pulley 304. In one or more embodiments, the idler pulley axis 322 is disposed at a first longitudinal distance 326 from the drive pulley axis 318. As used herein, the term "longitudinal distance" means a distance between two elements or components as measured in a direction parallel to the longitudinal axis 110. Further, the first spindle pulley 312 can be disposed such that the first spindle pulley axis 314 is at a second longitudinal distance 328 from the drive pulley axis 318, and the second spindle pulley 338 can be disposed such that the second spindle pulley axis 340 is at a third longitudinal distance 339 from the drive pulley axis. In one or more embodiments, the first longitudinal distance 326 is greater than at least one of the second longitudinal distance 328 or the third longitudinal distance 339. In one or more embodiments, the first longitudinal distance 326 is equal to at least one of the second longitudinal distance 328 or the third longitudinal distance 339.

By ensuring that the first longitudinal distance 326 is greater than the second longitudinal distance 328, the fleeting angle 350 (FIG. 6) can be reduced; however, as the implement 114 can be raised or lowered relative to the drive pulley 304, the fleeting angle 350 can be increased or decreased. A large fleeting angle 350 can cause premature wear on the endless belt 306 or potentially cause the belt to slip or jump from one or both of the drive pulley 304 and the idler pulley 320. By increasing the longitudinal distance 326 between the drive pulley 304 and the idler pulley 320, the maximum fleeting angle 350 can be reduced. In one or more embodiments, the fleeting angle 350 is no greater than 10 degrees, no greater than 7 degrees, or no greater than 5 degrees as the deck moves between its range of heights (e.g., cutting heights of 1-5 inches).

Figure 6:
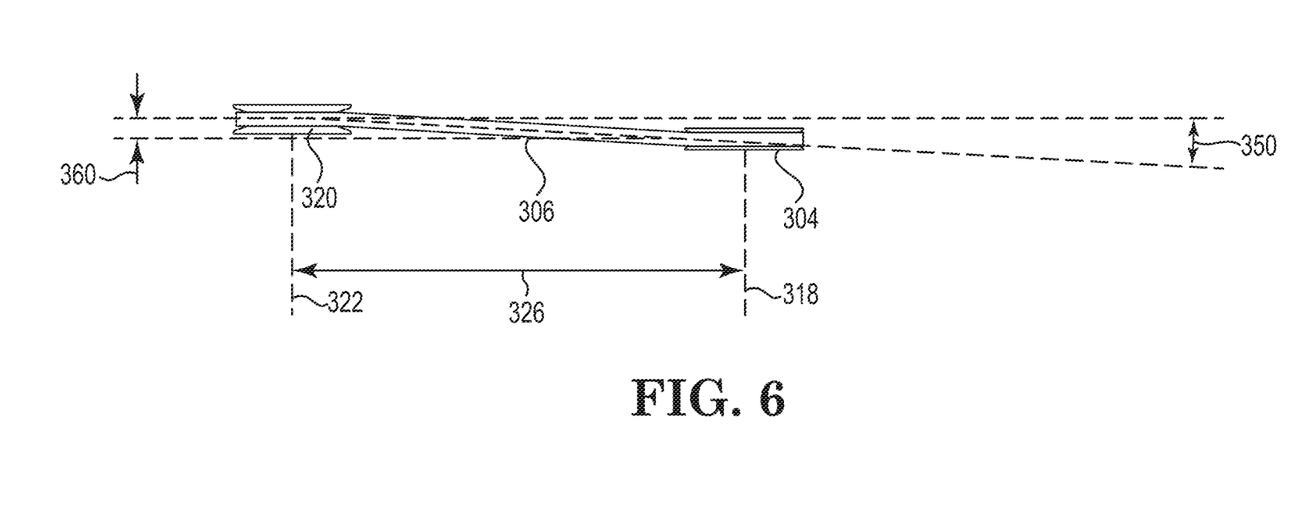
FIG. 6 is a partial side elevation view of a drive pulley, an idler pulley, and an endless belt of the implement drive system of the mower of FIG. 4.

The fleeting angle 350 of the endless belt 306 can be defined by an elevation 360 of the idler pulley 320 relative to the drive pulley 304 and a distance 326 between the drive pulley axis 318 and the idler pulley axis 322 (FIG. 6). In general, the fleeting angle 350 can vary based on the position of the tensioner 346. The position of the tensioner 346 can change slightly between belts 306 having differing tolerances and as the belt wears and stretches. The fleeting angle can also vary on each side of the longitudinal axis 110, i.e., on an entrance side of the drive pulley 304 and an exit side of the drive pulley (i.e., fleeting angle 350 as shown in FIG. 6). On the entrance side of the drive pulley 304 (i.e., on a left side of the longitudinal axis 110 as shown in FIG. 5), a fleeting angle of the endless belt 306 can be defined by an elevation of a second idler pulley 344 and a distance 337 between the drive pulley axis 318 and a second idler pulley axis 345 (FIG. 5).

The power system 300 can include any additional suitable elements or components. For example, in the embodiment illustrated in FIGS. 1-5, the power system 300 also includes a guide pulley 330 that is connected to the frame 102 or the implement 114 (e.g., the housing 308 of the implement) and is adapted to rotate about a guide pulley axis 332, which can be substantially parallel to the rotational axis 109 of the drive shaft 192. The guide pulley 330 can include any suitable pulley or pulleys. Further, the guide pulley 330 can be connected to the frame 102 or the implement 114 using any suitable technique or techniques.

The guide pulley 330 can be disposed in any suitable location relative to the drive pulley 304. For example, the guide pulley axis 332 can be disposed at a longitudinal distance 334 from the drive pulley axis 318. In one or more embodiments, this longitudinal distance 334 is greater than the first longitudinal distance 326 between the idler pulley axis 322 and the drive pulley axis 318.

The power system 300 can also include a second guide pulley 342 adapted to rotate about a second guide pulley axis 343, and a second idler pulley 344 adapted to rotate about a second idler pulley axis 345. Each of the second guide pulley 342 and the second idler pulley 344 are connected to frame 102 or the implement 114 (e.g., the housing 308 of the implement) using any suitable technique or techniques. The second guide pulley 342 and the second idler pulley 344 can include any suitable pulley or pulleys. Further, the second guide pulley 342 and the second idler pulley 344 can be disposed in any suitable location relative to the drive pulley 304. In one or more embodiments, the second guide pulley axis 343 of the second guide pulley 342 can be disposed at a longitudinal distance 335 from the drive pulley axis 318. In one or more embodiments, this longitudinal distance 335 is equal to the longitudinal distance 334 between the guide pulley axis 330 of the guide pulley 320 and the drive pulley axis 318 of the drive pulley 304. Similarly, the second idler pulley axis 345 can be disposed at a longitudinal distance 337 from the drive pulley axis 318.

In one or more embodiments, the endless belt 306 engages the drive pulley 304, the idler pulley 320, the first spindle pulley 312, the guide pulley 330, and the second spindle pulley 338. In one or more embodiments, the endless belt 306 engages the drive pulley 304, the idler pulley 320, the first spindle pulley 312, the guide pulley 330, the second guide pulley 342, the second spindle pulley 338, and the second idler pulley 344.

In one or more embodiments, a second fleeting angle of the endless belt (not shown) is further defined by an elevation of the second idler pulley 344 relative to the drive pulley 304 and a distance between the drive pulley axis 318 and the second idler pulley axis 345. In one or more embodiments, the fleeting angle is equal to the second fleeting angle. In one or more embodiments, the fleeting angle is different from the second fleeting angle.

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described, and reference has been made to possible variations of the same. These and other variations, combinations, and modifications will be apparent to those skilled in the art, and it should be understood that the claims are not limited to the illustrative embodiments set forth herein.

What is claimed is:

1. A grounds maintenance vehicle, comprising:
   a frame comprising a front end, a rear end, and a longitudinal axis extending between the front and rear ends;
   an implement comprising a cutting deck connected to the frame at or near the front end of the frame, the implement comprising:
      a housing;
      a first spindle pulley connected to the housing and adapted to rotate about a first spindle pulley axis; and
      a second spindle pulley connected to the housing and adapted to rotate about a second spindle pulley axis; and
   a power system comprising a prime mover and an implement drive system, wherein the prime mover is connected to the frame, wherein the implement drive system comprises:
      a drive pulley connected to the prime mover and adapted to rotate about a drive pulley axis;
      an idler pulley connected to the frame or implement and adapted to rotate about an idler pulley axis; and
      an endless belt engaging the drive pulley, the idler pulley, the first spindle pulley, and the second spindle pulley;
   wherein the idler pulley axis is disposed at a first longitudinal distance from the drive pulley axis, the first spindle pulley axis is disposed at a second longitudinal distance from the drive pulley axis, and the second spindle pulley axis is disposed at a third longitudinal distance from the drive pulley axis, wherein the first longitudinal distance is greater than each of the second longitudinal distance and the third longitudinal distance; and
   wherein a fleeting angle of the endless belt is defined by an elevation of the idler pulley relative to the drive pulley and a distance between the drive pulley axis and the idler pulley axis;
   wherein the implement is configured to be raised or lowered in a vertical direction relative to the drive pulley between a range of cutting heights;
   wherein the fleeting angle is no greater than 10 degrees as the cutting deck moves between its range of cutting heights, wherein the range of cutting heights is at least 1 inch and no greater than 5 inches.

2. The vehicle of claim 1, further comprising a second idler pulley connected to the frame or implement and adapted to rotate about a second idler pulley axis, wherein the endless belt further engages the second idler pulley, wherein the second idler pulley axis is disposed at a longitudinal distance from the drive pulley axis that is greater than each of the second longitudinal distance and the third longitudinal distance, and further wherein a second fleeting angle of the endless belt is further defined by an elevation of the second idler pulley relative to the drive pulley and a distance between the drive pulley axis and the second idler pulley axis.

3. The vehicle of claim 1, wherein the vehicle comprises a stand-on grounds maintenance vehicle comprising a platform attached to the frame at or near the rear end, wherein the platform is adapted to support a standing operator.

4. The vehicle of claim 1, wherein the drive pulley axis of the drive pulley of the power system intersects the longitudinal axis of the frame.

5. The vehicle of claim 1, wherein the implement drive system further comprises a guide pulley connected to the frame or implement and adapted to rotate about a guide pulley axis, wherein the guide pulley axis is disposed at a longitudinal distance from the drive pulley axis that is greater than the first longitudinal distance, wherein the endless belt further engages the guide pulley, and further wherein the endless belt extends along the belt path from the drive pulley to the idler pulley, the first spindle pulley, and the guide pulley.

6. The vehicle of claim 5, wherein the implement drive system further comprises a second guide pulley connected to the frame or implement and adapted to rotate about a second guide pulley axis, wherein the endless belt further engages the second guide pulley.

7. The vehicle of claim 6, wherein the second guide pulley axis is disposed at a longitudinal distance from the drive pulley axis that is equal to the longitudinal distance between the guide pulley axis of the guide pulley and the drive pulley axis of the drive pulley.

8. The vehicle of claim 6, further comprising a second idler pulley connected to the frame or implement and adapted to rotate about a second idler pulley axis, wherein the second idler pulley axis is disposed at a longitudinal distance from the drive pulley axis that is greater than each of the second longitudinal distance and the third longitudinal distance, wherein a second fleeting angle of the endless belt is further defined by an elevation of the second idler pulley relative to the drive pulley and a distance between the drive pulley axis and the second idler pulley axis; and further wherein the endless belt further engages the drive pulley, the idler pulley, the first spindle pulley, the guide pulley, the second guide pulley, the second spindle pulley, and the second idler pulley.

9. The vehicle of claim 1, wherein the power system further comprises a clutch connected to the drive pulley, wherein the clutch is adapted to selectively enable and disable power to the implement.

10. The vehicle of claim 1, wherein the vehicle comprises a lawn mower.

11. The vehicle of claim 1, wherein the implement further comprises a first cutting blade connected to a first spindle and a second cutting blade connected to a second spindle, wherein the first spindle pulley is connected to the first spindle and the second spindle pulley is connected to the second spindle.

12. A stand-on riding grounds maintenance vehicle, comprising:
a frame having a front end, a rear end, and a longitudinal axis extending between the front and rear ends, the frame further comprising a control tower at or near the rear end;
a platform connected to the frame at or near the rear end, the platform adapted to support a standing operator;
an implement connected to the frame at or near the front end of the frame, the implement comprising:
a housing;
a first spindle pulley connected to the housing and adapted to rotate about a first spindle pulley axis; and
a second spindle pulley connected to the housing and adapted to rotate about a second spindle pulley axis; and
a power system comprising a prime mover and an implement drive system, wherein the prime mover is connected to the frame, wherein the implement drive system comprises:
a drive pulley connected to the prime mover and adapted to rotate about a drive pulley axis;
an idler pulley connected to the frame or implement and adapted to rotate about an idler pulley axis; and
an endless belt engaging the drive pulley, the idler pulley, the first spindle pulley, and the second spindle pulley;
wherein the idler pulley axis is disposed at a first longitudinal distance from the drive pulley axis, the first spindle pulley axis is disposed at a second longitudinal distance from the drive pulley axis, and the second spindle pulley axis is disposed at a third longitudinal distance from the drive pulley axis, wherein the first longitudinal distance is greater than each of the second longitudinal distance and the third longitudinal distance; and
wherein a fleeting angle of the endless belt is defined by an elevation of the idler pulley relative to the drive pulley and a distance between the drive pulley axis and the idler pulley axis;
wherein the implement is configured to be raised or lowered in a vertical direction relative to the drive pulley between a range of cutting heights;
wherein the fleeting angle is no greater than 10 degrees as the cutting deck moves between its range of cutting heights, wherein the range of cutting heights is at least 1 inch and no greater than 5 inches.

13. The vehicle of claim 12, further comprising:
left and right rear drive wheels located near the rear end of the frame; and
left and right front wheels located near the front end of the frame.

14. The vehicle of claim 13, wherein at least a portion of the platform is located between the left and right rear drive wheels.

15. The vehicle of claim 12, wherein the implement comprises a cutting deck.

16. The vehicle of claim 12, wherein the drive pulley axis of the drive pulley of the power system intersects the longitudinal axis of the frame.

17. The vehicle of claim 12, wherein the implement drive system further comprises a guide pulley connected to the frame or the implement and adapted to rotate about a guide pulley axis, wherein the guide pulley axis is disposed at a longitudinal distance from the drive pulley axis that is greater than the first longitudinal distance, wherein the endless belt further engages the guide pulley, and further wherein the endless belt extends along the belt path from the drive pulley to the idler pulley, the implement pulley, and the guide pulley.

18. The vehicle of claim 12, wherein the power system further comprises a clutch connected to the drive pulley, wherein the clutch is adapted to selectively enable and disable power to the implement.

19. The vehicle of claim 12, wherein the vehicle comprises a lawn mower.

20. The vehicle of claim 12, wherein the implement further comprises a first cutting blade connected to a first spindle and a second cutting blade connected to a second spindle, wherein the first spindle pulley is connected to the first spindle and the second spindle pulley is connected to the second spindle.

* * * * *